Feb. 24, 1942.  O. A. ROSS  2,273,996
AUTONOMIC ELECTRICAL CURRENT CONVERTING DEVICE
Filed March 30, 1939
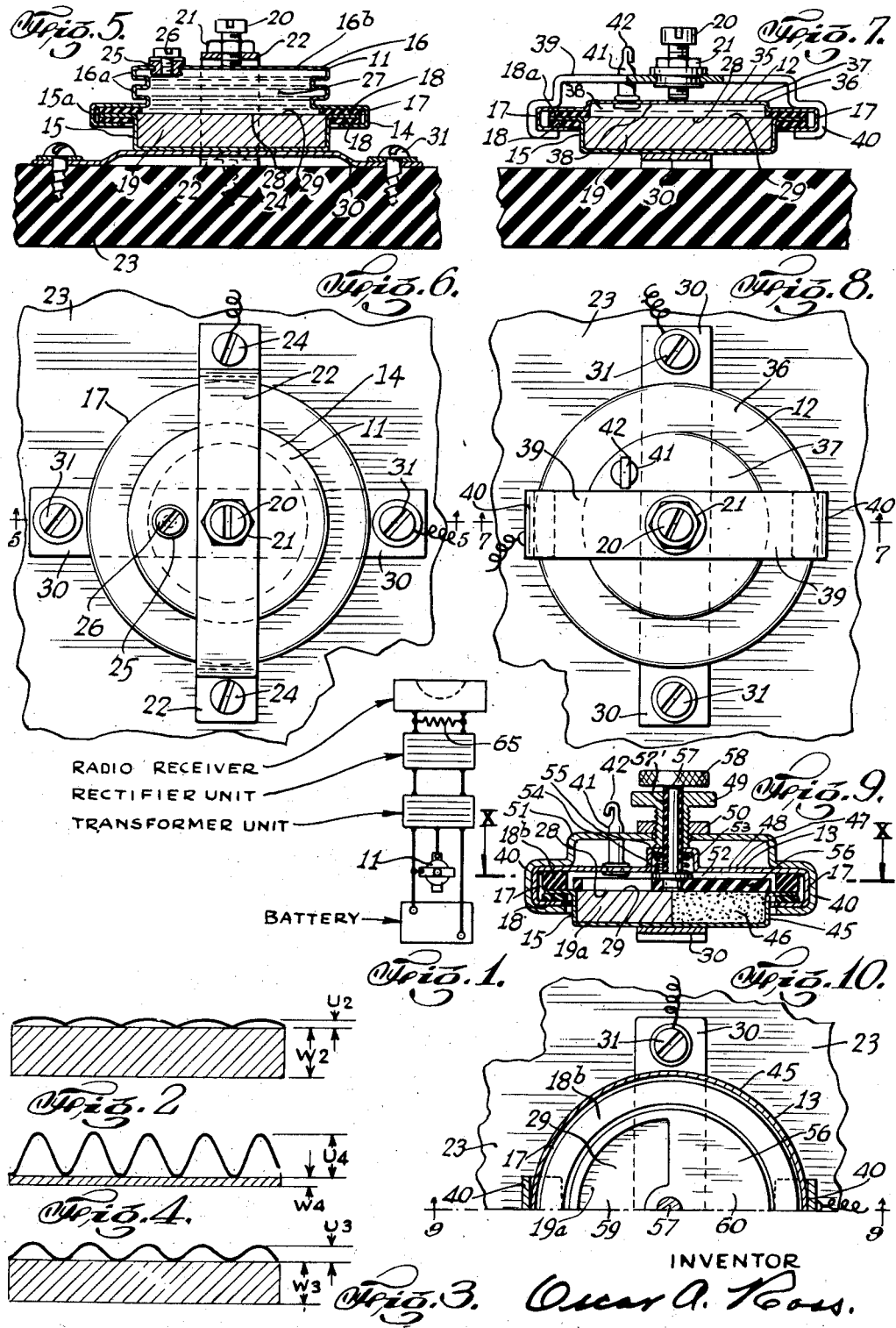
INVENTOR
Oscar A. Ross.

Patented Feb. 24, 1942

2,273,996

UNITED STATES PATENT OFFICE 2,273,996

AUTONOMIC ELECTRICAL CURRENT CONVERTING DEVICE

Oscar A. Ross, New York, N. Y., assignor to General Motors Corporation, Detroit, Mich., a corporation of Delaware Application March 30, 1939, Serial No. 264,991

17 Claims. (Cl. 200—113)

This invention relates to electrical current converters or modulators and more particularly to that form for converting a continuous flow current into an undulated flow, including a particular adaptation of said undulated flow.

This invention comprehends improvement in the form of current converting device disclosed by the Ruben Patent 2,107,742, granted February 8, 1938, including an improved circuit combination for the use of same.

This invention further comprehends the producing of a circuit converting device of comparatively low cost manufacture adapted for mass production and further comprehends a comparatively high efficiency of such devices. The invention further comprehends producing a current converting device for use in differing service conditions at the same time maintaining a comparatively high efficiency thereof for each differing purpose wherewith it is employed.

The invention further comprehends producing a current converting device wherein the frequency of the undulation may be varied at will during the use of the same.

The invention further comprehends producing a current converting device wherein the effective contact area of the current converting elements may be varied at will to suit the peculiar service condition for which said device is employed whereby the waste current may be reduced to a minimum.

The invention further comprehends producing a current converting device of peculiar form whereby the heat generated therein may be rapidly and efficiently dissipated thereby prolonging the life thereof.

This invention further comprehends producing a current converting device wherein the contacting surfaces between the current converting elements are peculiarly formed whereby the current converting action takes place over substantially the entire area thereof.

Other objects and advantages will appear as the description of the invention progresses and the novel features thereof will be pointed out in the appended claims.

This invention consists in the novel construction and arrangement of parts hereinafter described, delineated in the accompanying drawings and particularly pointed out in that part of this instrument wherein patentable novelty is claimed for certain and peculiar features of the invention, it being understood that, within the scope of what hereinafter thus is claimed, divers changes in the form, proportions, size and minor details of the structure shown, may be made without departing from the spirit of, or sacrificing any of the merits of the invention.

In describing the invention in detail, reference is made to the accompanying drawing wherein I have illustrated embodiments of the invention, and, wherein the characters of references, designate corresponding parts throughout the several views, and in which:

Fig. 1 is a circuit plan of improved form wherein applicant's improved current converting device is employed. Fig. 2 is a diagrammatic view showing a form of undulated current produced by current converting devices and Figs. 3 and 4 are similar views. Fig. 5 is a sectional view of one form of improved current converting device taken on line 5—5 of Fig. 6, and Fig. 6 is a plan view thereof. Fig. 7 is a sectional view of a modified form of current converting device taken on line 7—7 of Fig. 8, and Fig. 8 is a plan view thereof. Fig. 9 is a sectional view of still another modified form of current converting device taken on line 9—9 of Fig. 10 and Fig. 10 is a part sectional, part plan view thereof taken on line 10—10 of Fig. 9.

Referring to Figs. 5 and 6, current converting device 11 comprises metal housing 14, including lower cup-shaped housing portion 15 and upper cup-shaped corrugated bellows portion 16, having flange 17 insulatively clamping said housing portions together between annular insulating members 18—18, whereby said housing portions are insulated one from the other. Said housing portions have their interior surfaces preferably electro-plated with a non-readily oxidizable metal such as gold and lower housing portion 15 is filled with an electric-conducting medium or element 19, such as cemented cadmium oxide or carbon particles, which element is also cemented into said housing after which the contacting surface 29 thereof is surfaced to form a contacting face extending in a flat single plane, the face being parallel with the upper face of flange 15a of said lower housing portion 15. Upper housing portion 16 is formed with corrugations 16a producing a bellows-like or expandable structure wherein the upper portion 16b may be adjustably raised or lowered by action of screw 20 and nut 21 supported by bridge member 22 secured to base 23 by screws 24. Corrugations 16a also act to form a comparatively large heat radiating surface whereby the heat generated within device 11, when in use, may be quickly dissipated. Upper housing portion 16 is also supplied with filling member 25, including filling or seal screw 26 for sealing chamber 27 which is completely filled with liquid mercury, the lower face 28 of which is normally in electro-contact with the upper face 29 of element 19. Lower housing portion 15 is secured to plate or support member 30 also secured to base 23 by screws 31.

Referring to Figs. 7 and 8 showing modified current converting device or unit 12, the housing 35 includes lower housing portion 15 similar to that disclosed in Figs. 5 and 6, supported by plate member 30 secured to base 23 which member also serves to support the entire device. The upper housing portion 36 includes flange portion 17 for clamping securely said housing portions together between insulating members 18 and 18a, and also includes flexible top or disc portion 37 which is adjustably movable by screw 20 and nut 21 for varying the pressure in the mercury filled chamber 38 similarly to the action of screw 20 and nut 21 of Figs. 5 and 6, said screw and nut being supported by bridge member 39 having U shaped clamping portion 40 at each end thereof engaging and supported by flange 17. Upper housing portion 36 also supports bendable filler tube 41, the upper end 42 of which is bent over after chamber 38 has been filled with mercury for sealing the same in said chambers.

Referring to Figs. 9 and 10 showing still another modified form of current converting device 13, and wherein the area of contact between the conducting elements may be varied for producing a general purpose device. Housing 45 comprises lower housing portion 15a similar to Figs. 5 and 6, however, the cemented conducting element 19a occupies solely the left half portion of said housing portion, whereas the right half portion contains a cemented non-conducting element 46 formed of insulating material such as ordinary cement. Upper housing portion 47 includes flange 17 for clamping securely said housing portions between insulating members 18 and 18b, also flexible annular portion 48 which is adjustably moved by hollow screw 49 and nut 50 supported by bridge member 51 having embracing portions 40—40 engaging flange 17. The adjustment of said screw and nut acting to variably adjust the pressure in chamber 52 similarly to the action of screw 20 and nut 21. Upper housing portion 47 also includes cup-shaped portion 53, housing spring or resilient member 54, one end of which impinges on packing or gland 55 and the other end on a shoulder on shaft 57, passing through hollow screw 49 and rotated by hand piece 58. There is provided an insulating sleeve 57' between the interior of the bore through the threaded member 49 and the shaft 57 to electrically separate the two. Masking member 56 of insulating material has opening 59 and masking portion 60 to which latter portion is secured the lower end of shaft 57 for rotation thereof to adjustably mask off surface 29 of segmental element 19a and thereby vary the area of contact thereof exposed to the mercury in chamber 52 thereby permitting adjustment of the resistance of the device to the amount of current to be converted for use in the circuit with which said device may be associated.

It is to be understood that all the upper and lower housings described in Figs. 5 to 10 inclusive are made of metal and preferably have the interior surfaces thereof electro-plated with non-readily oxidizable metal, such as gold. It has been found that such treatment materially prolongs the life of the device as well as lowering its internal resistance, thereby increasing the efficiency thereof.

Referring to Fig. 1 diagrammatically showing circuit connections and apparatus to which applicant's improved devices may be applied. Said circuit plan is similar to that shown in said Ruben Patent 2,107,742, except that applicant's device 11, 12, or 13 has been substituted for the Ruben tube. Also a radio receiver requiring "B" battery input has been shown as connected to the output of the rectifier. As is well known the amount of "B" battery current required for average size radio receivers having 3 to 4 watts input to the loud speaker is comparatively small, and applicant has found that, with a current converting device made within manufacturing limits, the efficiency of such a device is comparatively low due to the comparatively large "waste" current as well as wave distortion as shown by Fig. 2 wherein the value U2 represents the useful current and the value W2 the waste current. The waste current corresponds to the area of contacting surface between the mercury and solid-conducting element in the Ruben tube which is unaffected by the current flowing in the tube circuit, and the useful current corresponds to that which is modulated and stepped up by the transformer unit. It will be noted that the undulations of Fig. 2 are chordal in form as compared to the desired sinusoidal wave form, this distorted wave acting to further lower the efficiency of the circuit combination and evenness of flow at the output of the rectifier unit. Applicant has discovered that by placing an auxiliary load, as for example resistance 65, Fig. 1, greater than the "B" battery load across the "B" battery input or rectifier output, that not only is the efficiency of a current converted device increased, but the wave form of the undulated current produced by such a device, is modulated to more closely approximate sinusoidal form as shown by Fig. 3, and that by making this auxiliary load several times that of the "B" battery load, a substantially pure sinusoidal form of wave is obtained, together with comparatively high efficiency of the current converting device and circuit combination wherein said device is included, said efficiency being well above 50% whereas without said auxiliary load the efficiency approximates less than 25%.

I have also discovered that for obtaining maximum efficiency and more approximate sinusoidal form of the undulated current a uniform pressure at all points of contact between the mercury and its correlated solid element must be maintained and that said uniform pressure can best be obtained by forming the contacting faces of said element solely in a horizontal plane whereby the pressure of the mercury contacting face is equal at any given point of contact with its correlated element whereby the quantity of gas generated and dispersed, or ionization or deionization, or other action which takes place between said faces is also of the same value at any given point or area of said faces; in this manner substantially eliminating "waste" current. It has been found that if a pressure differential is present between the mercury and its correlated conducting element, as is the case in the Ruben tube, the maximum action takes place at the point of minimum pressure, which in the Ruben tube is at the apex of his conducting element or cadmium oxide pencil, and the minimum action is somewhere below said apex depending upon the undulated current demand. In other words the action in the Ruben tube may be described as a hinge motion between the moving and fixed element whereas in the applicant's device the action may be described as a reciprocating motion between two flat surfaces, one of which is uniformly moved away and toward the other.

I have also discovered that by arbitrarily establishing a pressure of the mercury element onto its correlated or fixed element, greater than the weight of the mercury the frequency of the undulations may be varied, such varied pressure being accomplished by the adjustment of screws 20 and 49 as hereinbefore described, it being the theory that if a gas is generated between the contacting surfaces, said gas will be generated under pressure and therefore will require a longer period of time for generating a sufficient volume thereof to separate said contacting surfaces for interrupting the flow prior to the dissipation thereof.

Since heat is generated in current converting devices of the class described, I have also found that, to rapidly dissipate said heat, the conducting elements should preferably be made in wafer form as shown, and at least as great, and preferably greater area of the body thereof be in direct contact with the wall of the metal housing wherein said elements are contained, the opposite wall of which is exposed to atmosphere or secured to other heat dissipating elements as shown by the applicant's disclosure. Each of the upper and lower housing portions of the devices 11, 12 and 13 are supplied with a suitable terminal lug or binding post to which the electrical conductors supplying energy thereto, may be soldered or otherwise attached.

I have also discovered that plating the interior walls of the metal housing 14, 35 and 45 with a non-readily oxidizable metal, as for example gold, reduces the internal resistance of the device and also tends to maintain a more fixed value of said resistance throughout the life of said device and also further prolongs the useful life of said device.

Applicant has found that to prolong the life of current converting devices of the class herein described, it is important to rapidly dissipate the heat generated therein, the major portion of which is absorbed by the mercury. Applicant has found that by forming the conducting elements in wafer-like form and exposing all the surface thereof except the undulating current producing faces in direct contact with a thin metal housing that said heat may be rapidly and efficiently dissipated. That since the major portion of the heat is absorbed by the mercury element it is also preferable to corrugate the housing part supporting the same to provide additional heat radiating surface as shown.

When current converting devices 11, 12 and 13 are made up for use in connection with "B" battery circuits as shown said devices are comparatively smaller in size than shown, the size being such that including the auxiliary load 65 the undulated current demand upon said devices will be sufficient to produce separating action between the undulated current producing surfaces thereof over the entire area of said surfaces, thereby reducing the "waste" current to a minimum, in this manner obtaining a comparatively high efficiency of said devices as well as the circuit combination in which said devices are incorporated.

It is to be understood that the fixed conducting elements as 19 and 19a are in electrical contact with the inner surfaces or walls of the lower housing parts supporting the same, and likewise that the mercury element is also in electrical as well as mechanical contact with the inner surfaces or walls of the upper housing parts containing the same.

When introducing the mercury into the chambers as 27, 38 or 52, these chambers are preferably first exhausted of all air whereby said chambers are completely filled with said mercury which also extends up to the ends 42 of tubes 41.

The unit 11 of Figs. 5 and 6 is also supplied with a supporting member 30 secured to lower housing part 15, said member being secured to base 23 by screw members 24.

It is to be understood that the flexible top portions 31 and 47 of units 12 and 13 may also include circular corrugations in the body thereof for adding further flexibilty if so desired.

Applicant's device as before stated, is an improvement over the form shown in the patent there identified and the device operates on the same general principle; that is, when current is supplied so that there is a flow from the resistance disc to the mercury disc a certain amount of heat will be applied to the mercury in contact with the resistance disc and at a certain critical point of the temperature sufficient heat will be applied to vaporize the mercury in contact with the resistance disc which of course will cause the mercury at that area to separate from the surface of the resistance member. The resistance of the mercury vapor of course is considerably higher than either the resistance of the mercury per se or the resistance disc and current flow through that area will be momentarily discontinued. The mercury vapor will at once recondense reforming the circuit and current will again flow. If a sufficiently high current were applied to flow through these two members, a sufficient amount of heat would be generated to cause an entire discontinuance of current flow therethrough. However, normally this would not be so and only a portion of the mercury is vaporized but this raises the resistance to flow through the member sufficiently to cause the current to fluctuate in the manner shown in Figs. 2, 3 and 4, depending upon the amount of current flowing through the mechanism. It might also be pointed out at this juncture that the pressure on the mercury will vary the ease with which the mercury in contact with the resistance disc is vaporized and by increasing the pressure more current will be required to vaporize some contact mercury. This is the purpose of providing the adjustable screw 20 which may force the upper shell up or down, depending upon the operator's desire.

What I claim is:

1. In an autonomic device for converting uniflow electric current into undulated flow current, a chambered housing including a flexible portion, a fixed conducting element and a mercury conducting element including engaging contact faces in said chamber for producing undulated current, means in said chamber extending exterior of said housing for selectively varying the area of contact between said contact faces, and means exterior of said housing engaging said flexible housing portion for adjustably moving the same to vary the pressure of contact between said contacting faces.

2. In an autonomic device for converting uniflow electric current into undulated flow current, a chambered housing, a fixed electrical conducting element having a contact face in part of said chamber, a body of mercury having a contact face in electrical contact with said first-named contacting face in the other part of said chamber for producing undulated current, and means in said chamber extending exterior of said housing for selectively varying said area of contact between said elements.

3. In an autonomic device for converting uniflow electric current into undulated flow current, a chambered two-part housing, means for insulatively securing said housing parts together to form said chamber, a fixed body in one of said housing parts comprising electrical conducting and non-electrical conducting portions having contact faces in a common plane, a mercury body having a contact face adapted to contact with said first-named contacting faces in said other housing part, and means in said chamber extending exterior of said housing for selectively variably moving the area of contact of said mercury contact face between the common faces of said part conducting and part non-conducting bodies.

4. In an autonomic device for converting uniflow electric current into undulated flow current, a chambered two-part metal housing, means for insulatively securing said housing parts together to form said chamber, a fixed electrical conducting element in one of said housing parts having a contact face, and a mercury body in the other said housing part also having a contact face engaging said first-named contact face whereby undulating current is produced, said contacting faces being formed solely in a horizontal plane.

5. In an autonomic device for converting uniflow electric current into undulated flow current, a two-part chambered metal housing, means for insulatively securing said housing parts together to form said chamber, a disc-like fixed conducting element in one of said housing parts having a contact face, and a disc-like body of mercury in said other housing part also having a contact face engaging said first-named contact face.

6. In an autonomic device for converting uniflow electric current into undulated flow current, a two-part chambered metal housing, means for insulatively securing said housing parts together to form said chamber, a fixed electrical conducting element supported in one of said housing parts having a contact face extending across said chamber, a body of mercury in said other housing part also having a contact face extending across said chamber engaging said first-named contact face, said fixed electrical conducting element being in electrical contact with substantially all the interior chamber wall of the housing part supporting the same.

7. In an autonomic device for converting uniflow electric current into undulated flow current, a two-part chambered metal housing, means for insulatively securing said housing parts together to form said chamber, a fixed electrical conducting element supported in one of said housing parts having a contact face extending across said chamber, a body of mercury in said other housing part also having a contact face extending across said chamber engaging said first-named contact face, said fixed electrical conducting element being in electrical contact with substantially all the interior chamber wall of the housing part supporting the same and said mercury body being in electrical contact with substantially all of the interior chamber wall of the housing parts supporting the same.

8. In an autonomic device for converting uniflow electric current into undulated flow current, a two-part chambered metal housing, means for insulatively securing said housing parts together to form said chamber, a fixed electrical conducting element supported in one of said housing parts having a contact face extending across said chamber, a body of mercury in said other housing part also having a contact face extending across said chamber engaging said first-named contact face, said contact faces extending across said chamber at the plane of insulated juncture of said housing parts.

9. In an autonomic device for converting uniflow electric current into undulated flow current, a two-part metal chambered housing, means for insulatively securing said housing part together to form said chamber, an electro-plated non-readily oxidizable metal covering formed on the interior walls of said housing parts, a fixed electrical conducting element in one of said housing parts having a contact face, and a body of mercury in said other housing part also having a contact face engaging first-named contact face.

10. In an autonomic device for converting uniflow electric current into undulated flow current, a two-part chambered metal housing, means for insulatively securing said housing parts together to form said chamber, a fixed electrical conducting element secured to one of said housing parts in said chamber having a contact face, a body of mercury in said other housing part also having a contact face engaging said first-named contact face, and a supporting face on said fixed element engaging the inner wall of the housing parts supporting the same having an area of contact therewith at least as great as the area of said opposite contact face.

11. In an autonomic device for converting uniflow electric current into undulated flow current, a two-part chambered metal housing, means for insulatively securing said housing parts together to form said chamber, a fixed electrical conducting element secured in one of said housing parts having a contact face, a body of mercury in said other housing part also having a contact face engaging first-named contact face, and heat dissipating corrugations formed on said last-named housing part extending inwardly of said chamber having the inner wall portion thereof engaging said mercury body.

12. In an autonomic device for converting uniflow electric current into undulated flow current, a two-part chambered metal housing, means for insulatively securing said housing parts together to form said chamber, a fixed electrical conducting element supported in one of said housing parts, a body of mercury in said other housing part in electrical contact with said fixed electrical conducting element, means secured to one of said housing parts for supporting said device, means including adjustable members engaging the exterior of said housing for adjustably varying the pressure within said housing, and means supported by said housing for supporting said pressure adjusting means.

13. In an autonomic device for converting uniflow electric current into undulated flow current, a two-part metal housing, means for insulatively securing said housing parts together to form a chamber there-between, a fixed electrical conducting element in one of said housings, a mercury body in said other housing part in electrical contact with said fixed element, one of said housing parts forming one electrical terminal of said device and the other housing part forming the opposite electrical terminal thereof.

14. In an autonomic device for converting uniflow electric current into undulated flow current, a chambered housing having a flexible wall portion, a fixed conducting element having a contact face in one portion of said chamber, a mercury body in the other portion of said chamber also having a contact face engaging said first-named contact face, and means exterior of said housing for adjustably exerting pressure on said flexible wall portion to selectively vary the pressure of contact between said contacting faces.

15. In an autonomic device for converting uniflow electric current into undulated flow current, a two-part chambered metal housing, each of said parts being stamped from uniform thickness sheet metal, means for insulatively securing said housing parts together to form said chamber, a fixed conducting element in one of said housing parts having a contact face, and a mercury body in said other housing part also having a contact face engaging said first-named contact face.

16. In an autonomic device for converting uniflow electric current into undulated flow current, a two-part chambered metal housing, each of said parts being stamped from uniform thickness sheet metal, means for insulatively securing said housing parts together to form said chamber, a wafer-like fixed conducting element in one of said housing parts having a contact face, and a wafer-like mercury body in said other housing part also having a contact face engaging said first-named contact face.

17. In an autonomic device for converting uniflow electric current into undulated flow current, a metal housing member including a fixed electrode secured therein, a second metal housing member insulatively secured to said first named housing member spacedly from said electrode, and a body of mercury in the space between said electrode and said last named housing member, said mercury filling all said space substantially to the exclusion of gas therein.

OSCAR A. ROSS.